United States Patent
Hopf et al.

(10) Patent No.: US 9,238,426 B2
(45) Date of Patent: Jan. 19, 2016

(54) METHOD FOR ACTUATING A SEAT

(75) Inventors: Manfred Hopf, Sankt Wolfgang (DE); Markus Wagenknecht, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1253 days.

(21) Appl. No.: 12/942,365

(22) Filed: Nov. 9, 2010

(65) Prior Publication Data
US 2011/0112449 A1 May 12, 2011

Related U.S. Application Data

(63) Continuation of application No. PCT/EP2009/004343, filed on Jun. 17, 2009.

(30) Foreign Application Priority Data

Jul. 10, 2008 (DE) .......................... 10 2008 032 541

(51) Int. Cl.
*A61H 7/00* (2006.01)
*B60N 2/44* (2006.01)
*B60N 2/02* (2006.01)

(52) U.S. Cl.
CPC ............ B60N 2/448 (2013.01); B60N 2/0244 (2013.01); *A61H 2201/0149* (2013.01); *A61H 2201/1238* (2013.01); *A61H 2201/50* (2013.01)

(58) Field of Classification Search
CPC ............ A61H 7/00; A61H 1/00; A61H 1/02; A61H 1/0244; A61H 1/0292; A61H 7/007; A61H 9/00; A61H 9/005; A61H 9/0078; A61H 2001/02; A61H 2001/0244; A61H 2007/00; A61H 2007/007; A61H 2009/00; A61H 2009/005; A61H 2201/12; A61H 2201/1238; A61H 2201/1409; A61H 2201/1623; A61H 2201/1628; A61H 2201/1633; A61H 2201/50; A61H 2201/85002; A61H 2201/5056; A61H 2203/0431; A61H 2205/088; B60N 2/448; B60N 2/0244
USPC .......... 601/23, 24, 26, 84, 89, 90, 91, 96, 97, 601/98, 105, 107, 108, 114, 148–152; 297/283.1, 283.2, 283.3, 284.1, 284.2, 297/284.3, 284.4, 284.6
See application file for complete search history.

(56) References Cited

U.S. PATENT DOCUMENTS 5,022,385 A * 6/1991 Harza ........................... 601/149
5,637,076 A * 6/1997 Hazard et al. ..................... 601/5
(Continued)

FOREIGN PATENT DOCUMENTS

DE 38 30 235 C2 3/1990
DE 43 31 663 C1 3/1995
(Continued)

OTHER PUBLICATIONS

German Search Report dated Dec. 12, 2008 including partial English-language translation (Nine (9) pages).
(Continued)

*Primary Examiner* — Quang D Thanh
(74) *Attorney, Agent, or Firm* — Crowell & Moring LLP

(57) ABSTRACT

A seat having a backrest and a seat cushion is provided with at least one adjusting element on both sides of the longitudinal center plane of the seat. By alternatingly actuating the adjusting elements in the two halves of the seat, mobilization of the spinal column of a seat user occurs. In order to increase the acceptance of such a mobilization, which requires comparatively long stroke lengths of the adjusting elements to achieve a physiological effectiveness, an accustomization phase occurs before the action phase. During the accustomization phase, the adjusting elements exercise, for example, only about half of the stroke during the action phase. Preferably, a transition phase may be interposed between the accustomization phase and the action phase.

13 Claims, 4 Drawing Sheets

(56) References Cited

U.S. PATENT DOCUMENTS

| | | |
|---|---|---|
| 6,213,553 B1 | 4/2001 | Fitz |
| 6,224,563 B1 | 5/2001 | Nonoue et al. |
| 6,398,303 B1 | 6/2002 | Herrmann et al. |
| 2006/0049678 A1 | 3/2006 | Kern et al. |
| 2008/0309132 A1 | 12/2008 | Katsuta |
| 2009/0099490 A1 | 4/2009 | Durt et al. |

FOREIGN PATENT DOCUMENTS

| | | |
|---|---|---|
| DE | 195 47 964 A1 | 6/1997 |
| DE | 297 05 530 U1 | 7/1997 |
| DE | 198 19 225 A1 | 11/1999 |
| DE | 201 08 345 U1 | 9/2001 |
| DE | 199 10 877 B4 | 1/2006 |
| DE | 10 2006 018 184 A1 | 10/2007 |
| DE | 102 42 760 B4 | 10/2007 |
| EP | 0 832 634 B1 | 4/1998 |
| EP | 0 991 342 B1 | 4/2000 |
| EP | 1 688 119 A1 | 8/2006 |
| GB | 2 222 366 A | 3/1990 |
| WO | WO 2007/121874 A1 | 11/2007 |

OTHER PUBLICATIONS

International Search Report dated Oct. 15, 2009 including English-language translation (Four (4) pages).

* cited by examiner

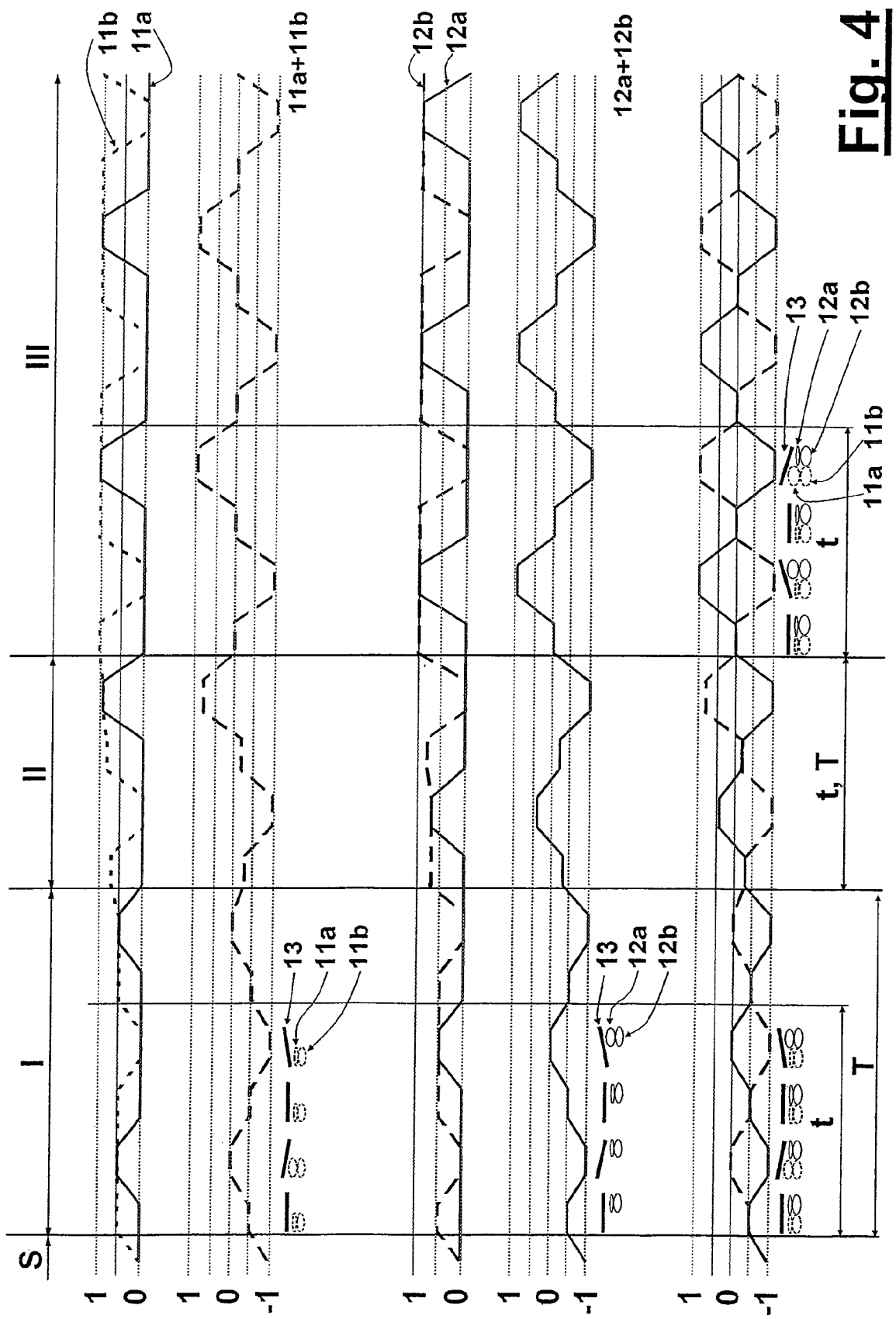

METHOD FOR ACTUATING A SEAT

CROSS-REFERENCE TO RELATED APPLICATIONS

This application is a continuation of PCT International Application No. PCT/EP2009/004343, filed Jun. 17, 2009, which claims priority under 35 U.S.C. §119 from German Patent Application No. DE 10 2008 032 541.4, filed Jul. 10, 2008, the entire disclosures of which are herein expressly incorporated by reference.

BACKGROUND AND SUMMARY OF THE INVENTION

The invention relates to a method for actuating a seat having a seat cushion and a backrest, as well as at least one adjusting element in the seat cushion and/or the backrest. During an action phase, the at least one adjusting element carries out a repeating stroke movement in order to mobilize the seat user's pelvis or back respectively, wherein the executed stroke length is physiologically effective.

WO 2007/121874 A1 discloses a seat having a plurality of adjusting elements in the seat cushion and the backrest. The adjusting elements in the two halves of the seat are adjusted alternatingly in such a manner that a rotational movement is actively exercised upon the pelvis and the back of the seat user. This active rotational movement corresponds to the movement sequence of the pelvis and the back while walking. In particular, EP 0 991 342 B1 describes that this movement tilts the pelvis in order to achieve a movement in the region of the lumbar section of the spinal column, thus achieving an effect on the intervertebral disks. For this purpose it is necessary that the adjusting elements exercise an adequately long stroke on the pelvis and/or the back of the seat user in order to achieve the described physiological effect.

However, the result is that the stroke movement of the adjusting elements has to be comparatively long in order to achieve the intended physiological effect, which many seat users perceive as uncomfortable, in particular in the phase directly after switching on the actuation system of the adjusting elements. However, after a defined period of accustomization, the active effect of the adjusting elements on the body regions that make contact with the seat is no longer perceived as disadvantageous.

The object of the invention is to improve the prior art actuation of the seat to the effect of enhancing the seat user's acceptance of a seat that mobilizes the pelvis and/or back by way of a physiologically effective stroke movement.

This object is achieved by a method for actuating a seat having a seat cushion and a backrest, as well as at least one adjusting element in the seat cushion and/or the backrest. During an action phase, the at least one adjusting element carries out a repeating stroke movement in order to mobilize the seat user's pelvis or back respectively, wherein the executed stroke length is physiologically effective. The action phase is preceded by an accustomization phase, during which the adjusting element performs a stroke length that is reduced in relation to the action phase, and that is not or is hardly physiologically effective.

Therefore, the core idea is to have the action phase, in which the adjusting elements carry out a stroke movement that is adequate for the physiological effect, preceded by an accustomization phase in order to slowly accustom the seat user to the comparatively long stroke lengths that are necessary for the physiological effect. During the accustomization phase the adjusting elements work with a stroke length that is significantly shorter than that of the action phase. Although the seat user is aware of this shorter stroke length, he does not perceive it to be uncomfortable. The shorter stroke length of the adjusting elements cannot generate to a substantial degree either a tilt movement of the pelvis or a rotational movement of the back. It may be possible to achieve even a massaging effect with the reduced stroke length, but no physiological effect in the sense of a mobilization of the pelvis and/or the back. Thus, the invention allows the seat user to be "tuned" to the longer stroke lengths during the action phase.

The preparatory accustomization phase precludes the seat user from perceiving the startup of the physiologically effective stroke movement of the adjusting elements, as known from WO 2007/121874 A1, as uncomfortable and consequently rules out the seat user not using the prior art system, even though it is available, for example, in a vehicle.

Since the actuation system, which is known from WO 2007/121874 A1, is usually not part of the standard equipment of a motor vehicle, but rather represents an option that the buyer must order, the buyer of a new vehicle can convince himself of the comfort of the inventive actuation prior to the configuration of his new vehicle. In the event that the seat is actuated according to the invention, the preceding accustomization step is more likely to convince the buyer to opt for a seat having the physiologically effective equipment according to WO 2007/121874 A1.

The physiologically effective adjusting elements, which are disclosed in WO 2007/121874 A1 and which are considered in conjunction with the present invention, should be distinguished from the well-known "massage seats", where the objective is only a massage effect, as described, for example, in the German patent document DE 201 08 345 U1 or DE 38 30 235 C2, without a physiologically effective mobilization of the pelvis and/or the back of the seat user.

The transition between the accustomization phase and the action phase can occur suddenly, that is, with a comparatively large gradient of change in the stroke length. However, in terms of the comfort of the seat user it may be more practical to gradually carry out the transition from the accustomization phase and the action phase.

An especially advantageous embodiment proposes that a relatively short transition phase be provided between an initial accustomization phase and the subsequent action phase that in principle continues without limitation. During this transition phase the stroke length of the accustomization phase is gradually adapted to the stroke length of the action phase. This latter variant makes it possible to provide a relatively long "attunement" during the accustomization phase with a short stroke length, so that the seat user can basically become accustomed to the stroke movement of the adjusting elements. Then this accustomization phase is followed by a comparatively fast transition into the action phase.

The seat user can influence in an advantageous manner the stroke length of the adjusting elements during the accustomization phase. The time duration of the accustomization phase and/or the transition phase can also be selected by the seat user. In contrast, the stroke length of the adjusting elements during the action phase is usually preset so as to be invariable in order to guarantee the physiological effect.

One advantageous embodiment of the invention provides that when the actuation of the seat is put into motion, the accustomization phase starts automatically. Then, after a defined preliminary run time of the accustomization phase, the transition into the transition phase or the action phase takes place automatically.

As an alternative, it can be provided that the seat user can personally choose between a start with the accustomization phase and an immediate start of the action phase. To the extent that the actuation provides a transition phase, it is possible to make a choice with more options by selecting a sequence with or without a transition phase or by starting the actuation with the transition phase. In principle, the actuation can be interrupted or terminated, starting from any phase, directly by the seat user or as a function of the vehicle based parameters.

The selection of the accustomization phase, the transition phase and the action phase can be achieved in an especially easy way by use of a switch that directly actuates the individual phases when the user actuates (such as by "tapping") the switch several times in succession. For example, if the switch is tapped once, then it is possible to start the normal sequence "accustomization phase that passes over into the action phase with the transition phase." If, in contrast, the switch is tapped twice, then it is possible to start, for example, the sequence with a transition phase. Finally, if the switch is tapped three times, it is possible, for example, to start the actuation of the seat immediately with the action phase. The status of the actuation can be indicated to the seat user by a luminous signal, for example, by way of three light emitting diodes corresponding to the steps: accustomization phase-transition phase-action phase.

The stroke length during the accustomization phase is less than 70% of the stroke length that is necessary for the physiological effect during the action phase. Of course, it is possible to reduce the stroke length even more during the accustomization phase, for example, to 60%. In terms of a cautious accustomization, the stroke length during the accustomization phase is preferably less than 50% of the stroke length during the action phase.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 2 to 4 are flowcharts illustrating the time sequence of an actuation according to exemplary embodiments of the invention.

DETAILED DESCRIPTION OF THE DRAWINGS

Figure 1:
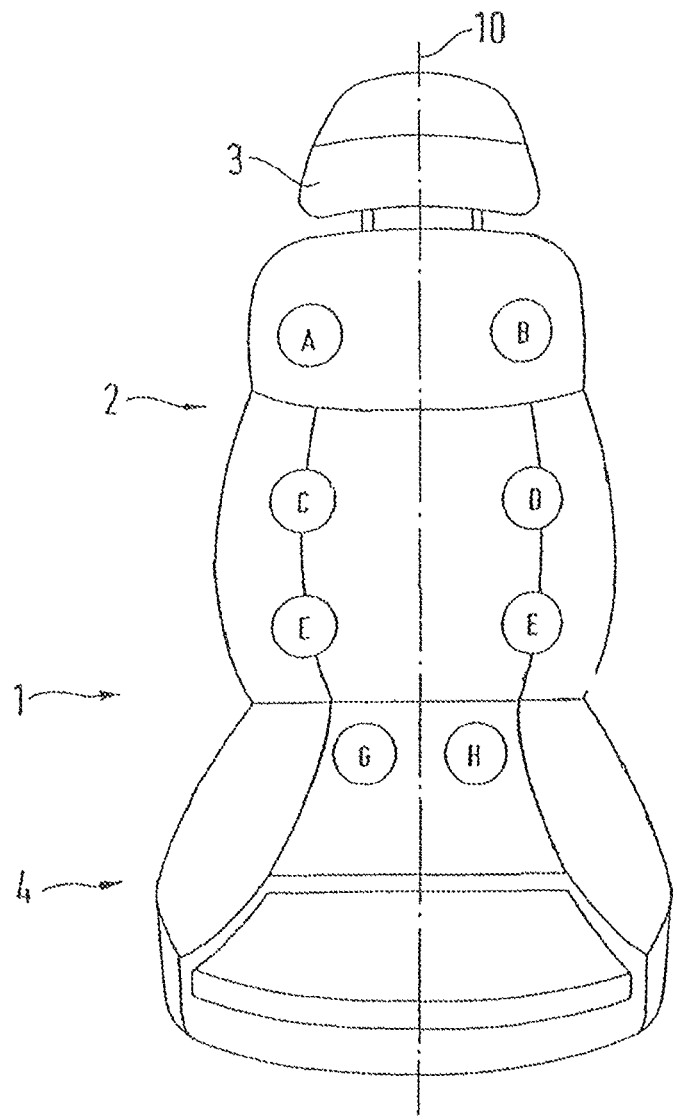
FIG. 1 shows a seat with a plurality of adjusting elements in the seat cushion and the backrest.

FIG. 1 illustrates a seat, all of which bears the reference numeral 1 and which has a backrest 2, a headrest 3, and a seat cushion 4. The longitudinal center plane of the seat 1 has the reference number 10. The backrest 2 has six adjusting elements A to F, where the adjusting elements A, C and E are arranged in a mirror-symmetrical manner with respect to the adjusting elements B, D and F. The seat cushion 4 has two adjusting elements G and H, which are also arranged symmetrically with respect to the longitudinal center plane 10 of the seat 1. The adjusting elements G and H are arranged in that region of the seat cushion 4 that is opposite a seat user's ischial tuberosities.

The adjusting elements A to H are arranged in a covered manner below the seat user's contact surface with the seat 1. They are constructed as stroke elements and can perform a movement approximately perpendicular to the seat user's contact surface at the seat 1. As a result, a force and consequently a movement is exercised on the back and/or posterior of a seat user. The stroke movement of the adjusting elements A to H makes it possible to rotate the back and to tilt the pelvis, as a result of which a mobilization of the spinal column is achieved. A massaging effect is primarily not intended.

Figure 2:
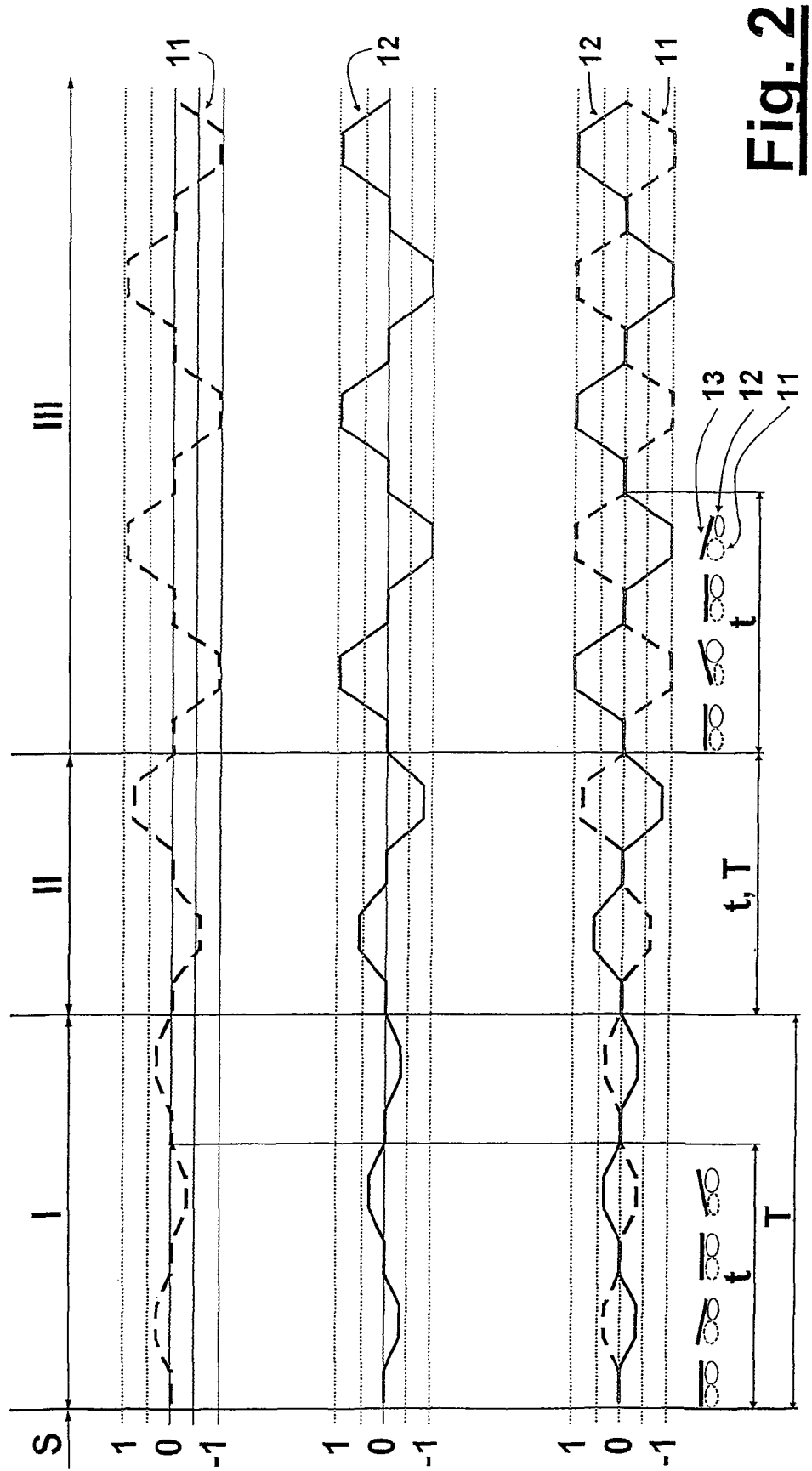
Figure 3:
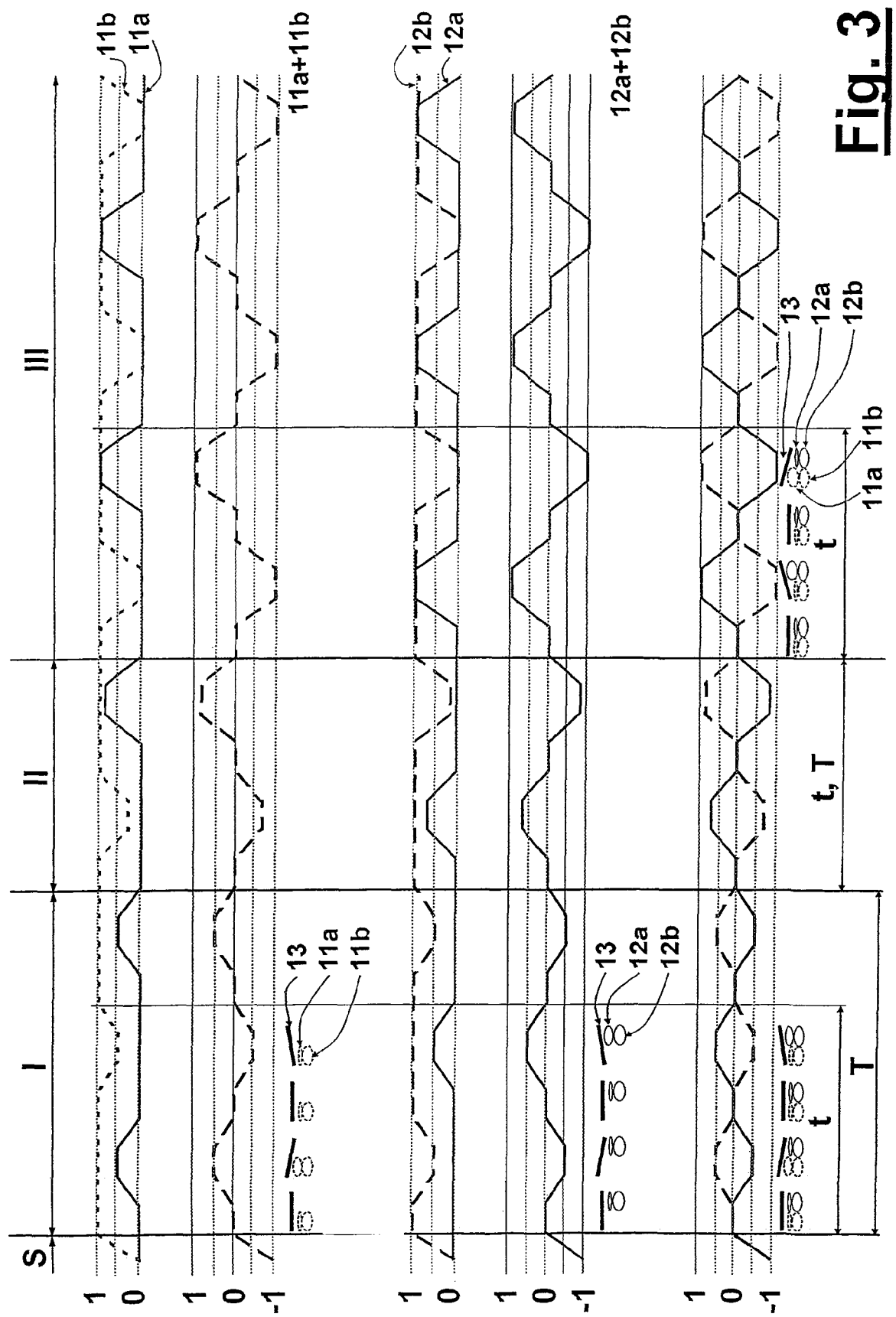

FIGS. 2 to 4 show flowcharts for actuating the seat 1 using the example of the adjusting elements G and H that cause the pelvis to tilt.

In the case of the embodiment according to FIG. 2, the adjusting elements G and H are configured as hydraulic bubbles 11 and 12. The bubbles 11 and 12 are filled alternatingly by pumping the hydraulic fluid cyclically back and forth between the two bubbles 11 and 12. The time intervals are specified by a stored control process. The amount of fluid to be pumped is controlled by the number of pulses delivered per revolution of the pump, as described in detail in EP 0 991 342 B1, paragraphs [0053] to [0059], which are incorporated by reference herein as non-essential matter.

Above the bubbles 11 and 12, the seat user's contact surface with the seat cushion 4 is illustrated by a bar 13. In this respect a horizontal orientation of the bar 13 symbolizes the normal position of the pelvis of the seat user, whereas a skewed position of the bar 13 symbolizes a tilting of the pelvis of the seat user.

Starting from a starting phase S, in which the adjusting elements G and H of the seat 1 are deactivated, the actuation sequence begins with the accustomization phase I, which passes over into the action phase III via a transition phase II. Then the transition from one phase to the next takes place through a change in the volume flow between the bubbles 11 and 12 by increasing the number of pulses delivered per revolution at the pump per unit of time during the transition phase II until the total number of pulses is reached in the action phase III.

In the initial state the bubbles 11 and 12 are situated in a middle position, in which the bubbles 11 and 12 are half full. This initial state is assigned the stroke length "0", whereas the maximum stroke length is reached at the measurement number "1". The stroke lengths that are located in-between are denoted by the measurement numbers between "0" and "1".

The sequence according to FIG. 2 begins after the starting phase S with the accustomization phase I, in which the degree, to which the bubbles 11 and 12 are filled, is limited to approximately 40% of the maximum degree of filling possible. Then starting from a middle position of the two bubbles 11 and 12, the left bubble 11 is moved upwards with a stroke length of "+0.4" due to a suitably controlled hydraulic filling process, whereas the bubble 12 is evacuated to the same degree "−0.4", that is, moved downwards. This strategy causes the pelvis to tilt, as apparent from the tilted drawing of the bar 13. After a holding period, the bubble 12 is evacuated, and the bubble 11 is filled, so that once again the middle position of the bubbles 11 and 12 is reached and held for a defined time duration. Then the bubbles 11 and 12 are filled in the opposite direction in that the hydraulic fluid is pumped from the bubble 11 into the bubble 12 until the bubble 11 has carried out the stroke length "−0.4", and the bubble 12 has carried out the stroke length "+0.4". This phase is also followed by a holding period for the tilting of the pelvis of the seat user.

The first cycle is terminated when the hydraulic fluid is pumped from the bubble 12 back into the bubble 11 until the middle position of the bubbles 11 and 12 is reached again.

The duration t of the described cycle is, for example, approximately 90 seconds and includes a reverse tilting of the pelvis of a seat user with intermediate holding periods. Of course, shorter or longer cycle times t may also be specified, even with reverse pumping and holding times that are dimensioned so as to vary in length of time.

The time duration T of the accustomization phase I is, for example, approximately 9 minutes, that is, consists of six consecutive cycles with a maximum filling of the bubbles 11a to 12b of up to approximately 40%. The chart according to FIG. 2 shows the repetition of the cycles during the accustomization phase I in an exemplary manner by showing only half of a subsequent cycle.

In the subsequent transition phase II the degree, to which the bubbles 11 and 12 are filled, is increased to approximately 60 and 80% in two steps (stroke lengths "+/−0.6" and "+/−0.8" respectively), as apparent from the center portion of the chart in FIG. 2.

The transition phase can consist, as depicted, of just one cycle. As an alternative, a plurality of cycles is also contemplated, of course, even with a cycle duration t that deviates from the accustomization phase I.

The transition phase II is followed by the action phase III, when the bubbles 11 and 12 are filled up to 100%, as a result of which there is a total bubble stroke of "+/−1", as apparent from the right portion of the chart according to FIG. 2. The action phase III is, in principle, unlimited with respect to time.

The sequence according to the invention can be implemented in an advantageous fashion without modifying the mechanical adjusting elements A to H. The sole criterion is a suitable programming of the actuation software in order to select the speed of the pump and to specify the complete sequence over time.

FIGS. 3 and 4 relate to inventive sequences using pairs of pneumatic bubbles 11a and 11b or 12a and 12b respectively that are arranged one above the other. Such an arrangement and their basic operating principle are described in detail in EP 0 991 342 B1, paragraphs [0060] to [0063], also incorporated herein by reference as non-essential matter.

The charts shown in FIGS. 3 and 4 are identical in terms of their basic sequence, yet differ by a "constant middle position" (FIG. 3) and an "ascending middle position" (FIG. 4).

The evacuated state of the bubbles 11a and 11b as well as 12a and 12b is denoted with "0", whereas the maximum stroke length of each individual bubble is equal to the measurement number "1". The stroke lengths that lie in-between are denoted with the measurement numbers between "0" and "1", so that, for example, half of the maximum stroke length of each of the bubbles 11a and 11b as well as 12a and 12b is equal to the measurement number "0.5".

In contrast to the hydraulic bubbles 11 and 12 according to FIG. 2, all of the pneumatic bubbles 11a and 11b as well as 12a and 12b according to FIGS. 3 and 4 are empty in the starting state. To arrive at a middle position, the first step is to fill the bottom bubbles 11b and 12b, so that the starting state S of the seat 1 is reached. At the same time the upper bubbles 11a and 12a remain empty.

In the sequence according to FIG. 3, the first step, starting from the empty state of all of the bubbles 11a and 11b as well as 12a and 12b, is to completely fill (stroke length "1") the bottom bubbles 11b and 12b. After a holding duration during this starting phase S, the next step initiates the accustomization phase I, in that in analogy with the cycle, already known from EP 0 991 342 B1, the simultaneous filling of the left upper bubble 11a and the evacuation of the right bottom bubble 12b takes place, as a result of which the seat user's pelvis is tilted, said tilting being symbolized by a corresponding sloping position of the bar 13. The invention provides that during the accustomization phase I the left upper bubble 11a and the right bottom bubble 12b are not completely filled or evacuated, but rather only half filled or evacuated respectively (measurement number "0.5"). After a specified holding period the bubble 11a is emptied and the bubble 12b is filled, so that once again the middle position is reached and held. Then the right upper bubble 12a is partially filled, while the left bottom bubble 11b is simultaneously partially emptied, so that the pelvis of the seat user is tilted in the counter-clockwise direction. The first cycle is terminated when in reverse the right upper bubble 12a is evacuated and the left bottom bubble 11b is filled, so that once again the middle position is achieved.

As stated above with respect to FIG. 2, the duration T of the accustomization phase in the chart depicted in FIG. 3 should also be construed as just an example.

The accustomization phase I is followed by the transition phase II, in a manner analogous to that of the embodiment from FIG. 2. In this case tilting the pelvis to the left takes up to 70% of the maximum stroke length, while tilting the pelvis to the right takes up to 85% of the maximum stroke length.

The transition phase II is followed by the action phase III, with a maximum stroke length of the respective bubbles 11a and 11b as well as 12a and 12b (stroke length "1").

The embodiment according to FIG. 4 is also a flowchart of a pneumatic actuation, but in contrast to the embodiment from FIG. 3, with an ascending middle position.

Starting from the evacuated state of all bubbles 11a and 11b as well as 12a and 12b, the bottom bubbles 11b and 12b are only half filled initially (stroke length "0.5"). This middle position, which is lowered in relation to the embodiment from FIG. 3, is maintained during the entire accustomization phase I that runs, moreover, in a manner identical to that in the embodiment from FIG. 3.

The accustomization phase I is followed by the transition phase II with an ascending middle position. The raising of the middle position occurs by filling the two bottom bubbles 11b and 12b up to the stroke length "0.7", instead of raising during the accustomization phase I to the stroke length "0.5".

In order to tilt the pelvis to the left, the right upper bubble 12a is now filled up to the stroke length "0.7", and the left bottom bubble 11b is evacuated. After a preset holding period, the two bottom bubbles 11b and 12b are now filled up to the value "0.85" in order to raise the middle position.

After the expiration of the holding period, the left upper bubble 11a is almost completely filled, while the right bottom bubble 12b is evacuated, in order to complete the tilting of the pelvis to the right side. At the end of the transition phase II the two bottom bubbles 11b and 12b are completely filled, so that at this point the same middle position is reached as in the embodiment according to FIG. 3.

The transition phase II is followed by the action phase III, in a manner identical to that with respect to the embodiment according to FIG. 3.

In the case of the pneumatic bubbles 11a and 11b as well as 12a and 12b the time intervals are controlled, for example, by a constantly running cam-valve mechanism that is hereinafter referred to as the pressure distributor. The necessary air volume flow is provided by a pneumatic pump. The pump is driven by the pressure distributor and the seat control unit.

In order to reach an ascending middle position in the embodiment according to FIG. 4, the volume flow per unit of time for the accustomization phase I is reduced by suitable software control and increased during the transition phase II until the necessary volume flow for the action phase III is reached.

In order to reach a constant middle position in the embodiment according to FIG. 3, the volume flow is allocated to the individual bubbles 11a and 11b as well as 12a and 12b in different amounts by the enabled choke valves. Another possibility consists of, for example, the use of choke valves with variable valve lift and valve closing curve geometries. This strategy can be realized with a cam shaft having valve lobes that extend conically in the axial direction. In this respect the size, time and time sequence of the valve opening are achieved by displacing the cam shaft in the axial direction by means of an additional actuator.

As apparent from the aforesaid, the amount of equipment and control engineering complexity required for achieving a constant middle position is greater than in the case of the variant with an ascending middle position.

However, the advantage of the constant middle position is that in the starting phase S the seat user is raised once to the middle position. In contrast, the flowchart according to FIG. 4 shows that the seat user's ischial tuberosities are raised in both the starting phase S and in the transition phase II. However, under normal operating conditions this gradual raising is hardly perceived by the seat user.

All of the general information and statements that are given above in conjunction with the embodiment according to FIG. 2 apply correspondingly to the embodiments according to FIGS. 3 and 4.

The seat user can terminate the actuation of the seat 1 directly from any of the three phases I, II or III. Depending on the configuration of the switch for activation, the cycle can also be started with any of the phases I, II or III. However, preference is given to starting with the accustomization phase I in order to achieve the results of the invention.

In summary, a prior art seat 1 having a backrest 2 and a seat cushion 4 is provided with at least one adjusting element A to H on both sides of the longitudinal center plane 10 of the seat 1. By alternately actuating the adjusting elements A to H in the two halves of the seat 1 it is possible to mobilize the spinal column of the seat user. Since comparatively long stroke lengths of the adjusting elements A to H are necessary for a physiological effectiveness of this mobilization, in order to increase the acceptance of such a mobilization, an accustomization phase I is provided to occur before the action phase III. During the accustomization phase I the adjusting elements A to H exercise, for example, only about half of the stroke during the action phase III. Preferably, the transition from the accustomization phase I into the action phase III takes place via an interposed transition phase II.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a seat having a seat cushion and a backrest, at least one adjusting element being arranged in at least one of the seat cushion and the backrest, wherein the adjusting element is operatively configured to carry out, in an action phase, a repeating stroke movement having a stroke length physiologically effective in mobilizing a seat user's pelvis or back, respectively, the method comprising the acts of:

during an accustomization phase, alternatingly actuating the adjusting element a plurality of times, each of said plurality of times of alternatingly actuating the adjusting element having a reduced stroke length which is reduced in relation to the stroke length of the action phase that is physiologically effective, said reduced stroke length not being or minimally being physiologically effective; and after said accustomization phase, operating the adjusting element in the action phase to alternatingly actuate the adjusting element with said stroke length that is physiologically effective.

2. The method according to claim 1, wherein the action phase immediately follows the accustomization phase.

3. The method according to claim 1, wherein a transition from the accustomization phase into the action phase occurs gradually.

4. The method according to claim 1, further comprising the act of:

operating the seat in a transition phase between the accustomization phase and the action phase.

5. The method according to claim 4, wherein during the transition phase, the reduced stroke length of the accustomization phase is continuously increased to the stroke length of the action phase.

6. The method according to claim 1, wherein at least one of the reduced stroke length effective during the accustomization phase and a duration of the accustomization phase are adjustable.

7. The method according to claim 4, wherein at least one of the reduced stroke length effective during the accustomization phase, a duration of the accustomization phase, and a duration of the transition phase are adjustable.

8. The method according to claim 1, wherein upon initiating operation of the method, the method further comprises the acts of:

automatically starting the accustomization phase; and after a defined or preselected end of the accustomization phase, transitioning into at least one of a transition phase and the action phase automatically.

9. The method according to claim 1, wherein the reduced stroke length during the accustomization phase is less than 70% of the stroke length during the action phase.

10. The method according to claim 1, wherein the reduced stroke length during the accustomization phase is less than 60% of the stroke length during the action phase.

11. The method according to claim 1, wherein the reduced stroke length during the accustomization phase is less than 50% of the stroke length during the action phase.

12. The method of according to claim 1, wherein, during the accustomization phase, the reduced stroke length remains reduced in relation to the stroke length of the action phase that is physiologically effective.

13. The method according to claim 12, further comprising the act of:

operating the adjusting element in a separate transition phase which occurs after the accustomization phase and before the action phase, wherein the adjusting elements are alternatingly actuated a plurality of times during the transition phase, wherein each of said plurality of times of alternating actuations successively having a continuously increasing stroke length.

* * * * *